United States Patent
Han

(10) Patent No.: US 10,789,499 B2
(45) Date of Patent: Sep. 29, 2020

(54) METHOD FOR RECOGNIZING IMAGE, COMPUTER PRODUCT AND READABLE STORAGE MEDIUM

(71) Applicant: BOE Technology Group Co., Ltd., Beijing (CN)

(72) Inventor: Litong Han, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 107 days.

(21) Appl. No.: 16/161,970

(22) Filed: Oct. 16, 2018

(65) Prior Publication Data

US 2019/0286930 A1    Sep. 19, 2019

(30) Foreign Application Priority Data

Mar. 16, 2018   (CN) .......................... 2018 1 0219787

(51) Int. Cl.
G06T 7/11 (2017.01)
G06K 9/32 (2006.01)
G06N 3/04 (2006.01)
G06N 7/00 (2006.01)

(52) U.S. Cl.
CPC ......... *G06K 9/3241* (2013.01); *G06N 3/0454* (2013.01); *G06N 7/005* (2013.01); *G06T 7/11* (2017.01)

(58) Field of Classification Search
CPC .... G06N 3/0454; G06N 7/005; G06K 9/3241; G06T 7/11
See application file for complete search history.

(56) References Cited

U.S. PATENT DOCUMENTS

2004/0158455 A1   8/2004  Spivack et al.
2015/0036921 A1   2/2015  Lu et al.

FOREIGN PATENT DOCUMENTS

| CN | 103123726 A | 5/2013 |
| CN | 103914854 A | 7/2014 |
| CN | 104346801 A | 2/2015 |
| CN | 108596875 * | 9/2018 ........... G06T 7/0004 |

OTHER PUBLICATIONS

Chinese Office Action for corresponding application 201810219787.9 dated Dec. 27, 2019.
Zhu et al., IEEE International Conference on Multimedia and Expo; Visual Relationship Detection with Object Spatial Distribution, Jul. 10-14, 2017, pp. 379-384.
Lu et al. , Stanford University, Visual Relationship Detection with Language Priors, pp. 853-869.

* cited by examiner

*Primary Examiner* — Sam Bhattacharya
(74) *Attorney, Agent, or Firm* — Arent Fox LLP; Michael Fainberg

(57) ABSTRACT

A method for recognizing an image, a computer product and a readable storage medium are provided. The method includes: determining categories of a plurality of objects in an image to be detected, and a plurality of object regions where the objects are located; determining positions of the object regions in the image to be detected, and sizes of the object regions; determining a relative positional relationship between the objects according to the positions and the sizes of the object regions; and obtaining a semantic interpretation of the relative positional relationship between the objects according to the relative positional relationship between the objects.

15 Claims, 6 Drawing Sheets

1

METHOD FOR RECOGNIZING IMAGE, COMPUTER PRODUCT AND READABLE STORAGE MEDIUM

CROSS-REFERENCES TO RELATED APPLICATIONS

This application claims priority to Chinese patent application No. 201810219787.9 filed on Mar. 16, 2018, which is incorporated herein by reference in its entirety.

FIELD

The present disclosure relates to the field of image processing, and particularly to a method for recognizing an image, a computer product and a readable storage medium.

BACKGROUND

With the rapid development of the Computer Aided Diagnosis (CAD) technologies, an automatic analysis of a medical image has become increasingly popular. At present, the CAD technologies are generally applicable to diagnosing a disease based upon a medial image, e.g., separating an object region highly related to a diagnosis, a therapy, etc., from the medical image, i.e., a typical image segmentation process applicable to a neutral network, machine learning, etc. A Region of Interest (ROI) is obtained by segmenting to thereby lower a workload of the subsequent model data process so as to improve the recognition efficiency of the system.

SUMMARY

In an aspect of the disclosure, an embodiment of the disclosure provides a method for recognizing an image. The method includes: determining categories of a plurality of objects in an image to be detected, and a plurality of object regions where the plurality of objects are located; determining positions of the object regions in the image to be detected, and sizes of the object regions; determining a relative positional relationship between the objects according to the positions and the sizes of the object regions; and obtaining a semantic interpretation of the relative positional relationship between the objects according to the relative positional relationship between the objects.

In some embodiment, the determining the categories of the plurality of objects in the image to be detected, and the plurality of object regions where the plurality of objects are located includes: determining the categories of the plurality of objects in the image to be detected, and the plurality of object regions where the plurality of objects are located using a neutral network.

In some embodiment, the neutral network includes a Regions with Convolutional Neural Network, and the number of region proposals is no less than 200 in the Regions with Convolutional Neural Network.

In some embodiment, an intersection over union of region proposals is more than or equal to 0.5.

In some embodiment, the intersection over union of region proposals is more than or equal to 06 and less than or equal to 0.7.

In some embodiment, the determining the relative positional relationship between the objects according to the positions and the sizes of the object regions includes: determining a relative positional relationship between objects corresponding to two correlated ones of the object regions according to the positions and the sizes of the two correlated ones of the object regions in a dual-spatial-mask method.

In some embodiment, the method further includes: selecting any two of the object regions with their distance within in a preset range as the two correlated ones of the object regions.

In some embodiment, the obtaining the semantic interpretation of the relative positional relationship between the objects according to the relative positional relationship between the objects includes: inputting the categories of the objects and the relative positional relationship between the objects to a probability knowledge network, and obtaining the semantic interpretation of the relative positional relationship between the objects.

In another aspect of the disclosure, an embodiment of this disclosure provides a computer product. The computer product includes: a memory configured to store computer instructions; and one or more processors configured to execute the computer instructions to perform: determining categories of a plurality of objects in an image to be detected, and a plurality of object regions where the plurality of objects are located; determining positions of the object regions in the image to be detected, and sizes of the object regions; determining a relative positional relationship between the objects according to the positions and the sizes of the object regions; and obtaining a semantic interpretation of the relative positional relationship between the objects according to the relative positional relationship between the objects.

In some embodiment, the one or more processors further configured to execute the computer instructions to perform: determining the categories of the plurality of objects in the image to be detected, and the plurality of object regions where the plurality of objects are located using a neutral network.

In some embodiment, the neutral network comprises a Regions with Convolutional Neural Network, and the number of region proposals is no less than 200 in the Regions with Convolutional Neural Network.

In some embodiment, in the Regions with Convolutional Neutral Network, an intersection over union of region proposals is more than or equal to 0.5.

In some embodiment, the intersection over union of region proposals is more than or equal to 06 and less than or equal to 0.7.

In some embodiment, the one or more processors further configured to execute the computer instructions to perform: determining a relative positional relationship between objects corresponding to two correlated ones of the object regions according to the positions and the sizes of the two correlated ones of the object regions in a dual-spatial-mask method.

In some embodiment, the one or more processors further configured to execute the computer instructions to perform: selecting any two of the object regions with their distance within in a preset range as the two correlated ones of the object regions.

In some embodiment, the one or more processors further configured to execute the computer instructions to perform: inputting the categories of the objects and the relative positional relationship between the objects to a probability knowledge network, and obtaining the semantic interpretation of the relative positional relationship between the objects.

In a still another aspect of the disclosure, an embodiment of the disclosure provides a readable storage medium configured to store computer instructions, wherein the computer instructions that, when executed by a processor, cause the processor to perform one or steps in the above method.

DETAILED DESCRIPTION

Figure 1:
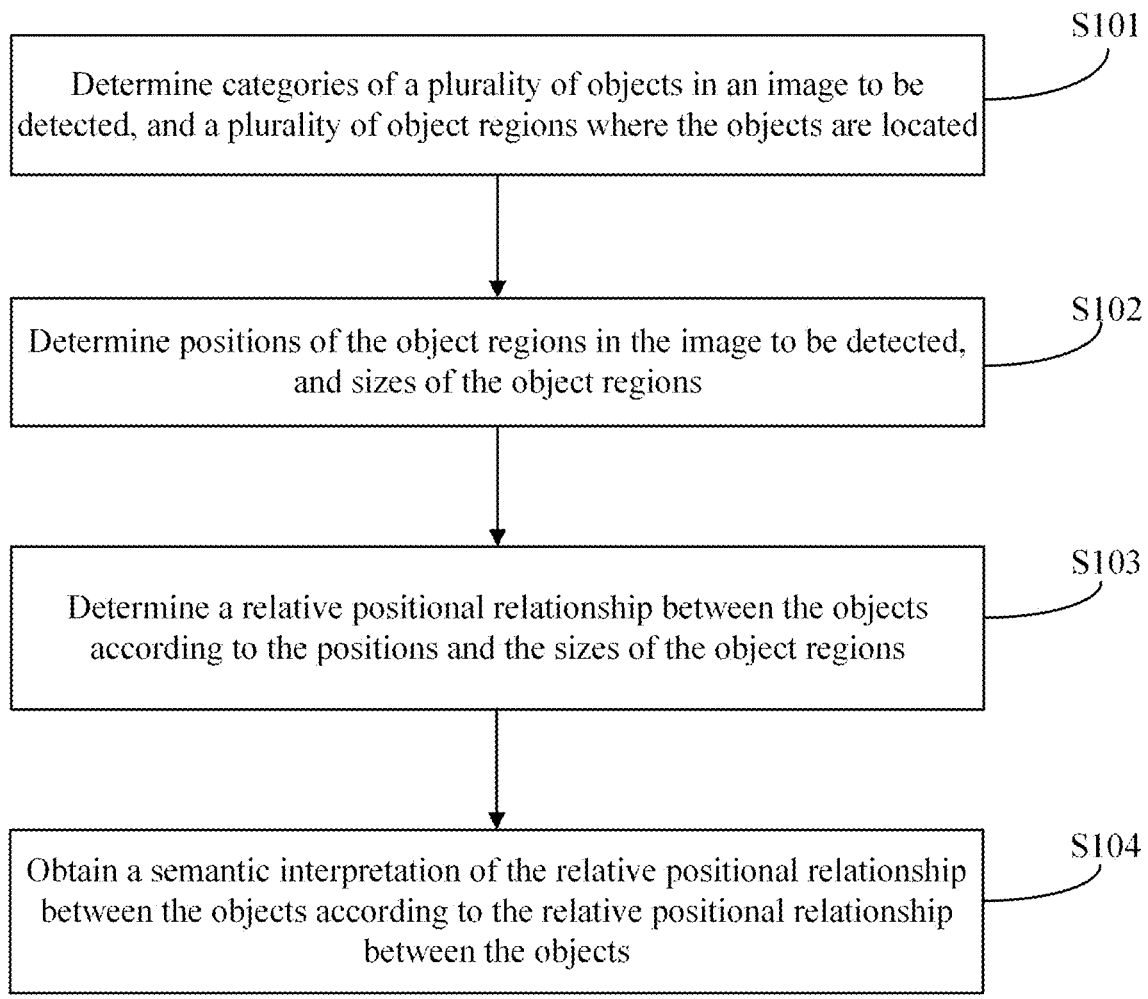
FIG. 1 is a first flow chart of a method for recognizing an image according to an embodiment of the disclosure.

In order to make the objects, technical solutions, and advantages of the disclosure more apparent, the disclosure will be described below in further details with reference to the drawings, and apparently the embodiments described below are only a part but not all of the embodiments of the disclosure. Based upon the embodiments here of the disclosure, all the other embodiments which can occur to those ordinarily skilled in the art without any inventive effort shall fall into the scope of the disclosure.

The shapes and the sizes of respective components in the drawings are not intended to reflect any real proportion, but only intended to illustrate the disclosure.

In the related art, a computer aided diagnosis is made through machine learning (a neutral network), machine vision, etc., by extracting valid features in an image, and categorizing or clustering the features to thereby semantically describe an ROI using the label of a corresponding category or cluster. The inventors have identified that this method neither describe the medial image as a whole nor interpret the medial image as a whole. For example, there are two objects in the image, and it generally can only be recognized in the image that some region is the object 1 (where the region of the object 2 is eliminated from training as an interfering feature) or some region is the object 2 (where the region of the object 1 is eliminated from training as an interfering feature), but such a global language description that there is some relationship between the object 1 and the object 2 can not be provided.

As known by the inventors, for those experts in a number of fields, e.g., a doctor or another experienced medical expert in the medical field, the expert observing a medial image pays attention to both a focus region, and the state of an organ or a pathologic site around the focus region to thereby make an accurate diagnosis. Accordingly the inventors have realized that the drawback in the related art can be at least partially addressed by semantically interpret a part of the image or the entire image as a whole.

As illustrated in FIG. 1, a method for recognizing an image according to an embodiment of this disclosure includes the following steps.

The step S101 is to determine the categories of a plurality of objects in an image to be detected, and a plurality of object regions where the plurality of objects are located.

The step S102 is to determine the positions of the object regions in the image to be detected, and the sizes of the object regions.

The step S103 is to determine a relative positional relationship between the plurality of objects according to the positions and the sizes of the object regions.

The step S104 is to obtain a semantic interpretation of the relative positional relationship between the objects according to the relative positional relationship between the objects.

In the method for recognizing an image according to the embodiment of the disclosure, firstly the categories of a plurality of objects in an image to be detected, and object regions where the objects are located are determined; thereafter the positions of the object regions in the image to be detected, and the sizes of the object regions are determined; lastly a relative positional relationship between the objects is determined according to the positions and the sizes of the object regions, so that the relative positional relationship between the plurality of objects in the image to be detected is recognized semantically.

Here "semantic" or "semantically" refers to a text (or equivalent to text, e.g., voice into which the text is converted) description of the image. For example, an image including a people riding a bicycle is semantically interpreted as People-Ride-Bicycle (or the like, etc., a people on a bicycle).

In some embodiments, in the method for recognizing an image according to the embodiments of the disclosure, the categories of the plurality of objects in the image to be detected, and the object regions where the objects are located are determined as follows.

The categories of the plurality of objects in the image to be detected, and the object regions where the objects are located are determined using a neutral network.

Specifically a bounding box and a morphology feature of each object in the image to be detected can be extracted using a neutral network, and common neutral networks can include a Regions with Convolutional Neural Network (RCNN), A Fast RCNN, a Faster RCNN, or Yolo, etc., although the embodiment of the disclosure will not be limited thereto.

Specifically in the approach using a neutral network, the number of region proposals shall not be preset too low; otherwise, there would be a too high recall rate, so when a larger number of region proposals are preset, then a detection object may be determined more accurately, but there may be a higher calculation workload. Accordingly the number of region proposals shall be preset as needed in reality.

In some embodiments of the disclosure, in the method for recognizing an image, the number of region proposals is preset no less than 200 when a neural network, e.g., an RCNN, a Fast RCNN, or a Faster RCNN is applied.

In some embodiments of the disclosure, in the method for recognizing an image, an Intersection over Union (IOU) of region proposals is more than or equal to 0.5, so that each potential object in the image to be detected can be checked for at least 15 to 20 times to thereby improve the probability that the object in the image is recognized, without any excessive workload of detecting the object.

Specifically in the method for recognizing an image according to the embodiment of the disclosure, a large number of region proposals significantly overlap with each other, but it is not necessary to detect each overlapping region proposal for an object, so the IOU is preset, and the IOU preset to 0.5 represents that only the region proposal with IOU no more than 0.5 and with a highest local score is reserved, and all the other regions with an IOU>0.5 are merged and transmitted for being detected for an object.

In some embodiments of the disclosure, in the method for recognizing an image, the IOU of region proposal is more than or equal to 0.6, and less than or equal to 0.7. For example, the IOU is preset to 0.6 or 0.7.

In a specific implementation, a detected object region is a rectangular region. Specifically in the method for recognizing an image according to the embodiment of the disclosure, the positions of the object regions in the image to be detected generally refer to coordinates (x, y) of the centers of the object regions (e.g., the rectangle regions) in the image to be detected. The sizes of the object regions refer to the widths and the lengths (w, h) of the rectangular regions, or are described as the relative positions of the rectangular regions to the image to be detected, and for example, the positions of the object regions in the image to be detected can be relative boundary parameters (tx, ty, tw, th) of a candidate box, where x and y represent translation while the proportion remaining unchanged, and w and h represent transformation of the height and the width thereof in a logarithmic space relative to a subject or a specific object. For example, when the entire background of the image is a reference system, the position of the background of the image is represented as $x_1$, $y_1$, $w_1$, $h_1$, and the position of the candidate box is represented as x, y, w, and h, then the relative boundary parameters tx, ty, tw, th are $((x-x_1)/w_1, (y-y_1)/h_1, \log w_1/w$, and $\log h_1/h)$.

In some embodiments of the disclosure, for a plurality of object regions in an image to be detected, as can be readily logically or empirically apparent, there is a lower probability of a relationship between objects too far away from each other in the image to be detected, or a part of the objects in the image to be detected are unlikely to be correlated with each other. For example, when an image of an injury on a skin includes a region of some imaged clothing, then it can be readily medically apparent that the clothing is not correlated with the injury on the skin. For example, there is such a spot on the edge of the image to be detected that is far away from the region of the injury on the skin, so there is a low probability that the spot is correlated to the injury on the skin. Accordingly in some embodiments, those object regions which are not correlated with each other are excluded according to the detected distances between the object regions (e.g., the distances between their centers) or their categories, to thereby improve the processing efficiency. Accordingly in the method for recognizing an image according to the embodiment of the disclosure, determining the relative positional relationship between the respective objects according to the positions and the sizes of the object regions includes: selecting any two object regions with their distance within a preset range as two correlated object regions before the relative positional relationship is determined.

In some embodiments, determining the relative positional relationship between the objects according to the positions and the sizes of the object regions includes: determining a relative positional relationship between objects corresponding to the two correlated object regions according to the positions and the sizes of the two correlated object regions in a dual-spatial-mask method.

Particularly the dual-spatial-mask method refers to that the two correlated object regions are masked in position and size respectively to thereby obtain the relative positional relationship and a relative size between the objects, and for example, the first object region is larger than and overlaps partially with the second object region, or the first object region is located above the second object region.

In some embodiments, obtaining the semantic interpretation of the relative positional relationship between the objects according to the relative positional relationship between the objects includes: inputting the categories of the objects and the relative positional relationship between the objects to a probability knowledge network, and obtaining the semantic interpretation of the relative positional relationship between the objects.

Particularly, for example, the category of an object can be determined according to the geometrical appearance, color, distribution, or another feature (e.g., the size, the shape, etc.) of the object, and for example, an object is determined as a woman or a girl using the RCNN and categorized into a female; and an object is determined as a ventricle region of a heart using the RCNN. With the dual-spatial-mask method, a positional relationship and a relative size between the objects is obtained, and for example, the object (e.g., the female) is located on the left to an object (e.g., a bicycle), and they do not overlap with each other; and for example, the object (e.g., the heart) is larger than an object (e.g., a vascular lump), and they overlap partially with each other on the left to the object (e.g., the heart). The obtained categories of the object, and the relative relationship and the relative size between the objects are input into a probability knowledge network to be connected to thereby obtain the semantic interpretation of their relationship.

Particularly, for example, the probability knowledge network can include a knowledge base (e.g., an expert knowledge base or a search knowledge base), and for example, the categories of the object, and the relative relationship and the relative size between the objects are connected with Google, Wikipedia, Pubmed, or another search engine to produce a relationship description of some correlation. For example, in the probability knowledge network, there are various words describing a relative relationship between a woman and a child, and probabilities of their corresponding positional relationship, and a part of the probabilities satisfying an all-connectivity input, e.g., a female riding a bicycle, a heart with a vascular lump, etc., are output; for example, there may be a trained neutral network (a large number of images are semantically interpreted and labeled as described above so that the neutral network can interpret a subsequently input image, and for example, such a neutral network can be embodied as a CNN, a Fully Convolutional Neural (FCN) network, a Long Short-Term Memory (LSTM) network, etc., and an applicable training dataset can be ImageNet, a CIFAR-10 dataset, a CIFAR-100 dataset, Microsoft COCO dataset, a Flickr Open Image dataset, CoPhIR, MSRA-MM, or another image database); and for example, there may be a trained neutral network describing knowledge, and for example, for a specific application field, e.g., the medial field, a focus, a physiological organ, etc., which may appear in an image can be interpreted by a medical expert using a semantic expression at a medical level, so a large number of medical images can be semantically interpreted as sample data to train and form the neutral network (for example, the sample data is in the format of the categories of the objects, and the relative positions and the relative sizes between the objects, and label is made using manual semantic interpretations of the medical expert, and for example, the label is in the format of "the shadow of a focus appears on the right above the image of a lung"), so that the medical semantic interpretation of a medical image can be output according to an output of the trained neutral network.

In the method for recognizing an image according to the embodiment of the disclosure, the object regions are recognized, and the relative relationship between the objects are further determined after the objects are recognized. A semantic description output based upon a relative relationship between objects is highly valuable to recognition of a medial image. For example, a vascular lump can be recognized, but also the position and the size of the vascular lump can be recognized to thereby produce a meaningful pathologic description (for example, there is a local lump of a vein, the lump is located on the right to the vein, and the size of the lump region is twice that of another lump region).

Figure 2:
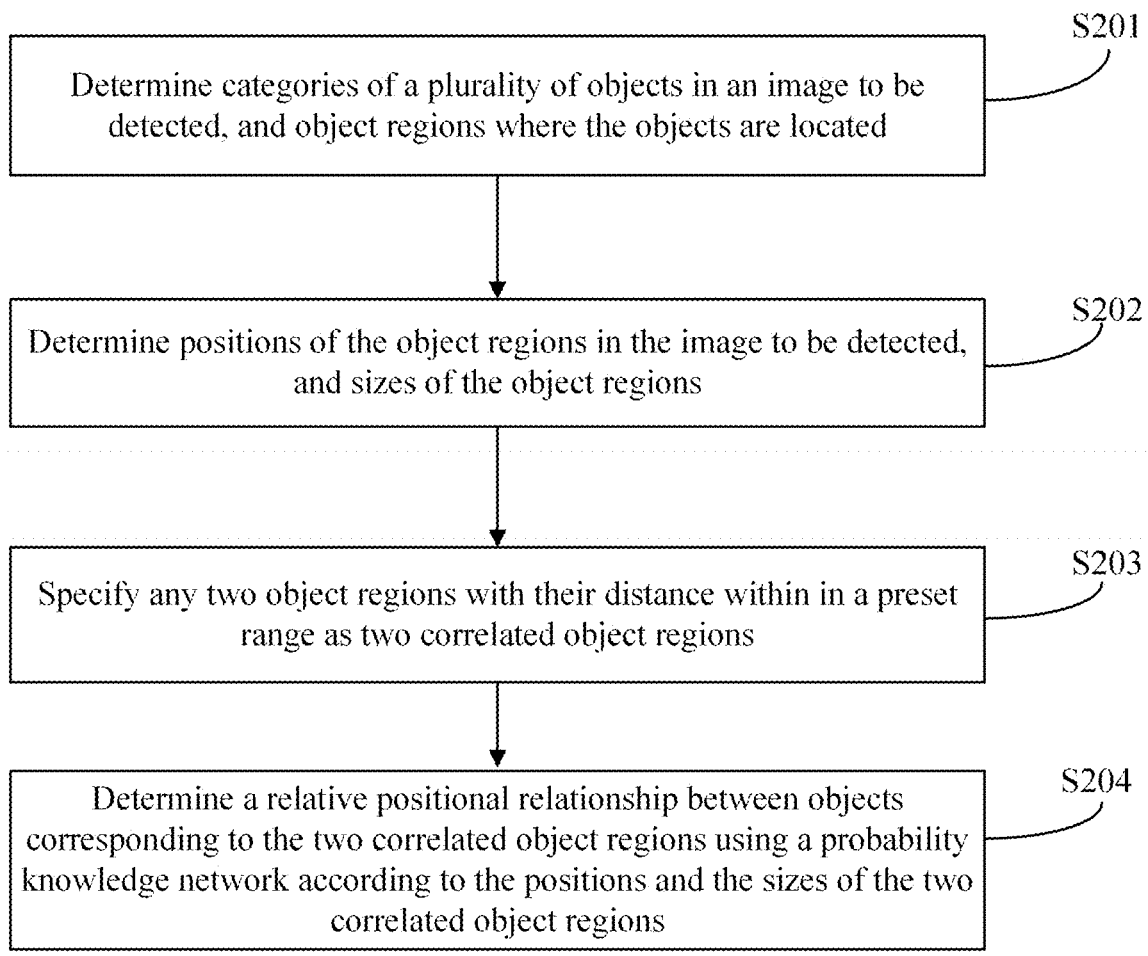
FIG. 2 is a second flow chart of the method for recognizing an image according to the embodiment of the disclosure.
Figure 3:
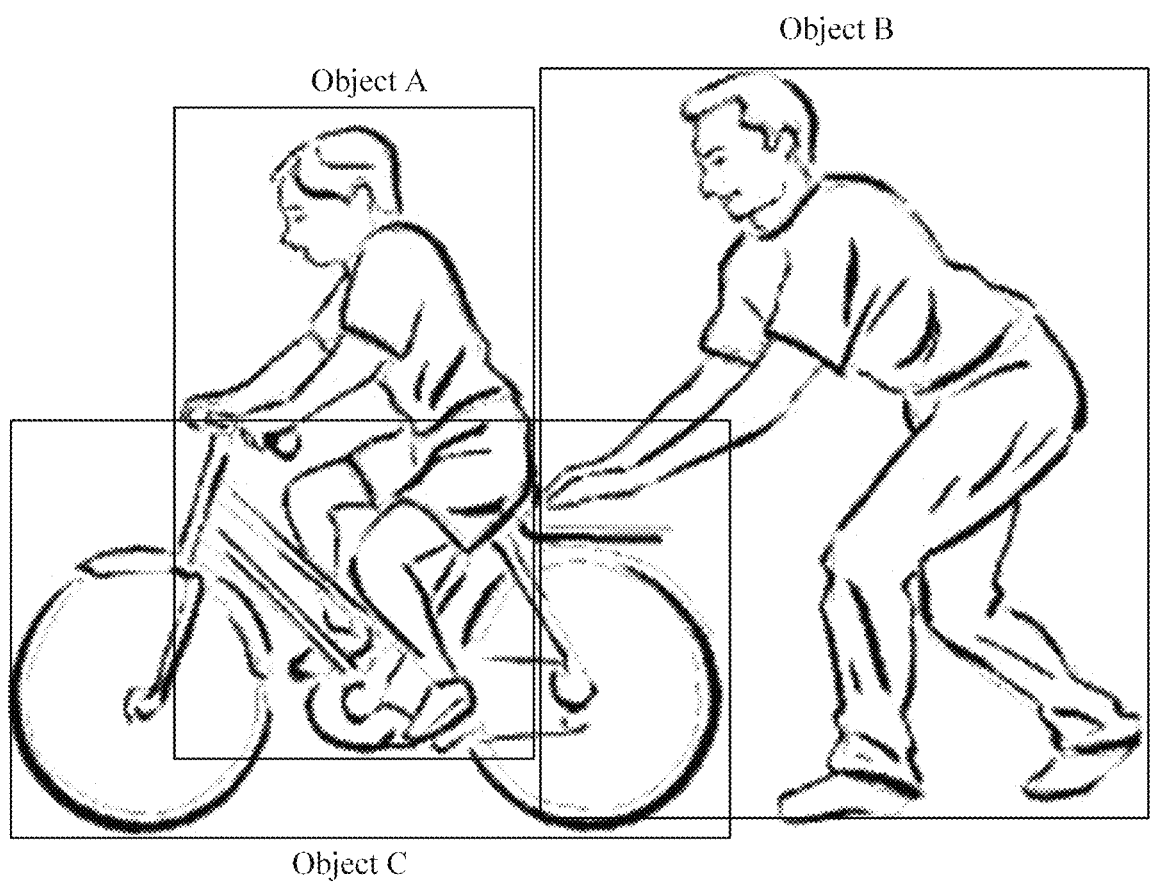
FIG. 3 is a schematic diagram of an image to be detected as referred to in the embodiment of the disclosure.

The method for recognizing an image according to the embodiment of the disclosure will be described below taking an image as illustrated in FIG. 3 as an example, and as illustrated in FIG. 2, the method includes the following steps.

The step S201 is to determine categories of a plurality of objects in an image to be detected, and object regions where the plurality of objects are located. For example, it is determined that an object A is a male, an object B is a male, and an object C is a bicycle in the image illustrated in FIG. 3.

Figure 4A:
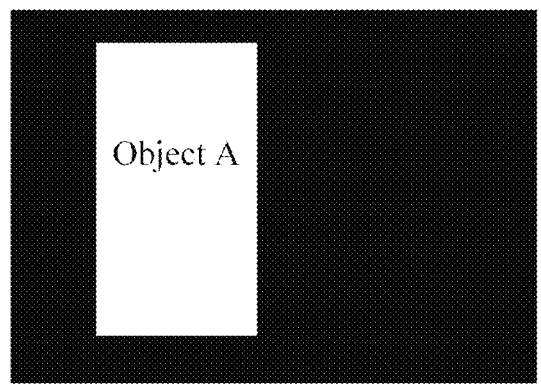
FIG. 4A to FIG. 4C illustrates spatial masks of objects in the image to be detected in FIG. 3.
Figure 4B:
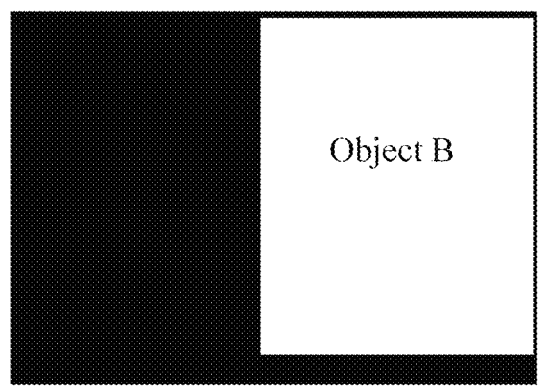
Figure 4C:
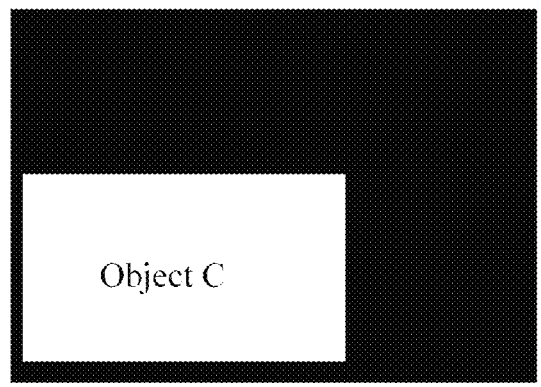

The step S202 is to determine the positions of the object regions in the image to be detected, and the sizes of the object regions. For example, FIG. 4A to FIG. 4C illustrates spatial masks of the objects.

Figure 5:
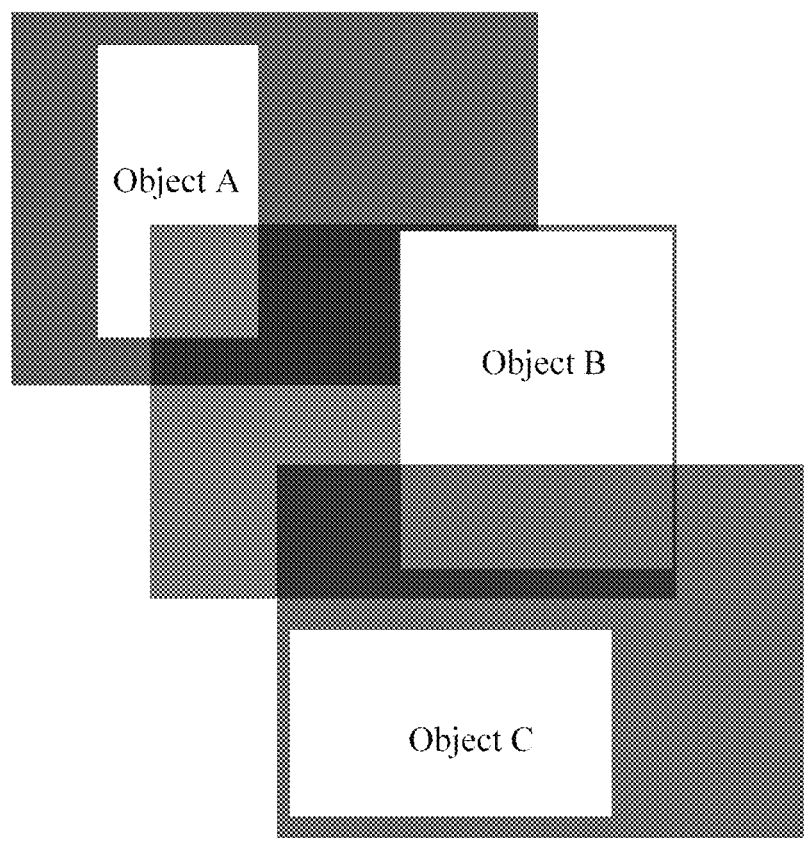
FIG. 5 is a comparison diagram between the spatial masks of the objects in the image to be detected in FIG. 3.

The step s203 is to specify any two object regions with their distance within in a preset range as two correlated object regions. For example, the masks of the objects overlap, as illustrated in FIG. 5, the region of the object A overlaps with the region of the object C, the region of the object B overlaps with the region of the object C, and the region of the object A is adjacent to the region of the object B, so the region of the object A and the region of the object C are two correlated object regions, and the region of the object B and the region of the object C are two correlated object regions, and the region of the object A and the region of the object B are two correlated object regions.

The step S204 is to determine a relative positional relationship between objects corresponding to the two correlated object regions using a probability knowledge network according to the positions and the sizes of the two correlated object regions. For example, the categories and the object regions are full-connected with a probability knowledge network which produces a relationship description of some correlation using Google, Wikipedia, Pubmed, or another search engine. For example, in the probability knowledge base, there are various words describing a relative relationship between a man and a bicycle, and probabilities of their corresponding positional relationship, and a part of the probabilities satisfying an full-connectivity input are output. For example, when a male and a bicycle are connected with a probability knowledge network, the probability knowledge network collects all the available images about a male and a bicycle, and pre-stores probabilities of specific cases of a relative position between the male and the bicycle, e.g., a probability that the male rides the bicycle, a probability that the male pushes the handles of the bicycle, a probability that the male sits on the backseat of the bicycle, a probability that the male pushes the backseat of the bicycle, a probability that the male stands by the bicycle, etc. For example, in FIG. 5, the region of the object A overlaps with the region of the object C, and the center of the object A is located above the center of the object C; and since there is a high probability that the male rides the bicycle in the probability knowledge network in this case, a relative positional relationship between the object A and the object C can be determined to be that the male rides the bicycle. For example, in FIG. 5, the region of the object B overlaps with the region of the object C, and the center of the object B is located behind and above the object C; and since there is a high probability that the male pushes the backseat of the bicycle in the probability knowledge network in this case, a relative positional relationship between the object B and the object C can be determined to be that the male pushes the backseat of the bicycle.

Based upon the same inventive idea, an embodiment of the disclosure further provides an apparatus for recognizing an image, and since the apparatus for recognizing an image addresses the problem under a similar principle to the method above for recognizing an image, reference can be made to the implementation of the method above for recognizing an image for an implementation of the for recognizing an image, and a repeated description thereof will be omitted here.

Figure 6:
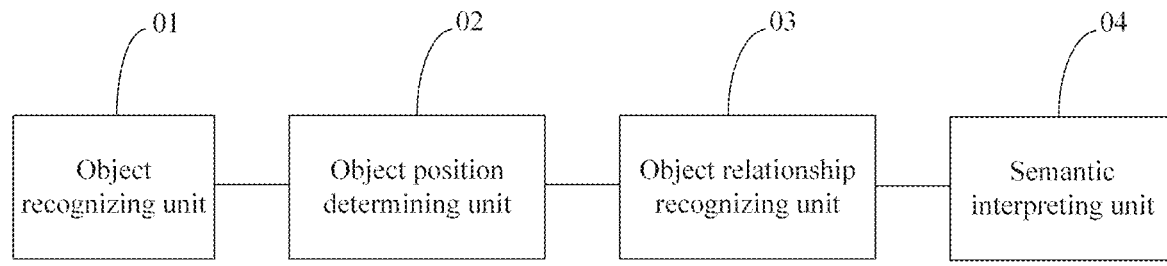
FIG. 6 is a schematic structural diagram of an apparatus for recognizing an image according to an embodiment of the disclosure.

Specifically in the apparatus for recognizing an image according to the embodiment of this disclosure, as illustrated in FIG. 6, the apparatus includes the following units.

An object recognizing unit 01 is configured to determine categories of a plurality of objects in an image to be detected, and a plurality of object regions where the plurality of objects are located.

An object position determining unit 02 is configured to determine positions of the object regions in the image to be detected, and the sizes of the object regions.

An object relationship recognizing unit 03 is configured to determine a relative positional relationship between the objects according to the positions and the sizes of the object regions.

A semantic interpreting unit 04 is configured to obtain a semantic interpretation of the relative positional relationship between the objects according to the relative positional relationship between the objects.

In some embodiments of the disclosure, in the apparatus for recognizing an image, the object recognizing unit 01 is configured to determine the categories of the plurality of objects and the plurality of object rejoins where the plurality of objects are located using a neutral network.

In some embodiments of the disclosure, in the apparatus for recognizing an image, the object recognizing unit 01 is configured to use a Regions with Convolutional Neural Network (RCNN), and the number of region proposals is no less than 200.

In some embodiments of the disclosure, in the apparatus for recognizing an image, an intersection over union of region proposals is more than or equal to 0.5.

In some embodiments of the disclosure, in the apparatus for recognizing an image, the intersection over union of region proposals is more than or equal to 06 and less than or equal to 0.7.

In some embodiments of the disclosure, in the apparatus for recognizing an image, the object relationship recognizing unit 03 is configured: to specify any two object regions with their distance within a preset range as two correlated object regions; and to determine a relative positional relationship between objects corresponding to the two correlated object regions according to the positions and the sizes of the two correlated object regions.

In some embodiments of the disclosure, the semantic interpreting unit 04 includes a probability knowledge network, the probability knowledge network is configured to output the semantic interpretation of the relative positional relationship between objects based upon the categories of the objects and a probability of a semantic of the relative positional relationship the between objects.

The probability knowledge network can be embodied as a search knowledgebase or a neutral network.

Figure 7:
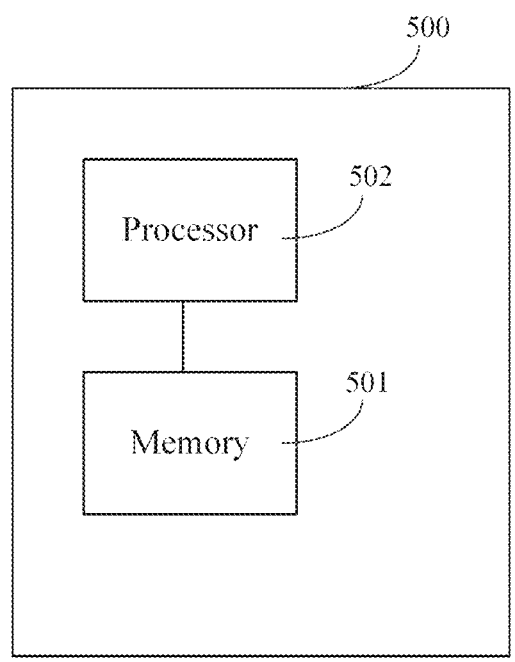
FIG. 7 is a schematic structural diagram of a computer product according to an embodiment of the disclosure.

Referring to FIG. 7, an embodiment of the disclosure further provides a computer product 500 for implementing the apparatus for recognizing an image according to the embodiment above of this disclosure. The computer product can include one or more processors 502 configured to execute computer instructions to perform one or more steps in the method above.

In some embodiments of the disclosure, the computer product 500 further includes a memory 501 connected with the processor 502, and configured to store the computer instructions.

The processor is configured to execute the computer instructions to perform the operations of: determining categories of a plurality of objects in an image to be detected, and a plurality of object regions where the plurality of objects are located; determining the positions of the object regions in the image to be detected, and sizes of the object regions; determining a relative positional relationship between the objects according to the positions and the sizes of the object regions; and obtaining a semantic interpretation of the relative positional relationship between the objects according to the relative positional relationship between objects.

In some embodiments of the disclosure, the processor is further configured to execute the computer instructions to perform: determining the categories of the plurality of objects in the image to be detected, and the plurality of object regions where the plurality of objects are located using a neutral network.

In some embodiments of the disclosure, the neutral network includes a Regions with Convolutional Neutral Network, and the number of region proposals is no less than 200 in the Regions with Convolutional Neutral Network.

In some embodiments of the disclosure, in the Regions with Convolutional Neutral Network, an intersection over union of region proposals is more than or equal to 0.5.

In some embodiments of the disclosure, the intersection over union of region proposals is more than or equal to 0.6 and less than or equal to 0.7.

In some embodiments of the disclosure, the processor is further configured to execute the computer instructions to perform: determining a relative positional relationship between objects corresponding to two correlated ones of the object regions according to the positions and the sizes of the two correlated ones of the object regions in a dual-spatial-mask method.

In some embodiments of the disclosure, the processor is further configured to execute the computer instructions to perform: selecting any two of the object regions with their distance within in a preset range as the two correlated ones of the object regions.

In some embodiments of the disclosure, the processor is further configured to execute the computer instructions to perform: inputting the categories of the objects and the relative positional relationship between the objects to a probability knowledge network, and obtaining the semantic interpretation of the relative positional relationship between the objects.

The computer product 500 can be implemented as a computer product structure for local computing, that is, the computer product 500 performs the method above at the user side; or the computer product 500 can be implemented as a computer product structure for local interaction with a remote end, that is the computer product 500 performs the method according to the embodiment above of the disclosure on a terminal at the user side to input an image, and the computer product 500 on a network server connected with the terminal at the user side receives the image to perform the method above.

In some embodiments, the computer product can include a plurality of terminal devices, and a network server connected with the plurality of terminal devices.

Specifically the plurality of terminal devices upload images of the terminal devices to the network server.

The network server obtains the image uploaded by the terminal devices, and performs the method for recognizing an image according to the embodiment above of the disclosure on the obtained images.

The memory 501 can be any one or more of any types of volatile or nonvolatile memory devices, e.g., a Static Random Access Memory (SRAM), an Electrically Erasable and Programmable Read Only Memory (EEPROM), an Erasable and Programmable Read Only Memory (EPROM), a Programmable Read Only Memory (PROM), a Read Only Memory (ROM), a magnetic memory, a flash memory, a magnetic disk, or an optical disc.

The processor 502 can be a Central Processing Unit (CPU), a Field Programmable Gate Array (FPGA), a Micro-Controller Unit (MCU), a Digital Signal Processor (DSP), an Application Specific Integrated Circuit (ASIC), a Graphic Processing Unit (GPU), or another logic operator capable of processing data and/or executing program.

The computer instructions include one or more processor operations defined by an instruction set architecture corresponding to the processor, and these processor operations can be logically included in or represented as one or more computer programs.

The computer product 500 can be further connected with various input devices (e.g., a user interface, a keyboard, etc.), various output devices (e.g., a speaker, etc.), and a display device to interact with another product or a user, and a repeated description thereof will be omitted here.

The connection can be made over a network, e.g., a wireless network, a wired network, or any combination thereof. The network can include a local region network, the Internet, a telecommunication network, an Internet of Things over the Internet and/or the telecommunication network, or any combination thereof. For example, the wired network can be a twisted pair network, a coaxial cable network, an optic fiber network, etc., and for example, the wireless network can be a 3G/4G/5G mobile communication network, a Bluetooth network, a Zigbee network, a Wi-Fi network, etc.

An embodiment of the disclosure further provides a computer readable storage medium configured to store computer instructions, where the computer instructions, when executed by a processor, cause the processor to perform one or more steps in the method above for recognizing an image.

In the method and apparatus for recognizing an image according to the embodiments of this disclosure, firstly the categories of a plurality of objects in an image to be detected, and object regions where the plurality of objects are located are determined; thereafter the positions of the object regions in the image to be detected, and the sizes of the object regions are determined; lastly a relative positional relationship between the respective objects is determined according to the positions and the sizes of the object regions, so that the relative positional relationship between the plurality of objects in the image to be detected is recognized semantically.

Evidently those skilled in the art can make various modifications and variations to the disclosure without departing from the spirit and scope of this disclosure. Thus the disclosure is also intended to encompass these modifications and variations thereto so long as the modifications and variations come into the scope of the claims appended to the disclosure and their equivalents.

The invention claimed is:

1. A method for recognizing an image, comprising:
   determining categories of a plurality of objects in an image to be detected, and a plurality of object regions where the plurality of objects are located;
   determining positions of the object regions in the image to be detected, and sizes of the object regions;
   determining a relative positional relationship between the objects according to the positions and the sizes of the object regions; and
   obtaining a semantic interpretation of the relative positional relationship between the objects according to the relative positional relationship between the objects;
   wherein the determining the relative positional relationship between the objects according to the positions and the sizes of the object regions comprises:
   determining a relative positional relationship between objects corresponding to two correlated ones of the object regions according to the positions and the sizes of the two correlated ones of the object regions in a dual-spatial-mask method.

2. The method according to claim 1, wherein the determining the categories of the plurality of objects in the image to be detected, and the plurality of object regions where the plurality of objects are located comprises:
   determining the categories of the plurality of objects in the image to be detected, and the plurality of object regions where the plurality of objects are located using a neutral network.

3. The method according to claim 2, wherein the neutral network comprises a Regions with Convolutional Neural Network, and the number of region proposals is no less than 200 in the Regions with Convolutional Neural Network.

4. The method according to claim 3, wherein an intersection over union of region proposals is more than or equal to 0.5.

5. The method according to claim 4, wherein the intersection over union of region proposals is more than or equal to 0.6 and less than or equal to 0.7.

6. The method according to claim 1, wherein the method further comprises:
   selecting any two of the object regions with their distance within in a preset range as the two correlated ones of the object regions.

7. The method according to claim 1, wherein the obtaining the semantic interpretation of the relative positional relationship between the objects according to the relative positional relationship between the objects comprises:
   inputting the categories of the objects and the relative positional relationship between the objects to a probability knowledge network, and obtaining the semantic interpretation of the relative positional relationship between the objects.

8. A non-transitory readable storage medium, configured to store computer instructions, wherein the computer instructions, when executed by a processor, cause the processor to perform one or more steps in the method according to claim 1.

9. A computer product, comprising:
   a memory configured to store computer instructions; and
   one or more processors configured to execute the computer instructions to perform:
   determining categories of a plurality of objects in an image to be detected, and a plurality of object regions where the plurality of objects are located;
   determining the positions of the object regions in the image to be detected, and sizes of the object regions;
   determining a relative positional relationship between the objects according to the positions and the sizes of the object regions; and
   obtaining a semantic interpretation of the relative positional relationship between the objects according to the relative positional relationship between the objects;
   wherein the one or more processors further configured to execute the computer instructions to perform:
   determining a relative positional relationship between objects corresponding to two correlated ones of the object regions according to the positions and the sizes of the two correlated ones of the object regions in a dual-spatial-mask method.

10. The computer product according to claim 9, wherein the one or more processors further configured to execute the computer instructions to perform:
    determining the categories of the plurality of objects in the image to be detected, and the plurality of object regions where the plurality of objects are located using a neutral network.

11. The computer product according to claim 10, wherein the neutral network comprises a Regions with Convolutional Neutral Network, and the number of region proposals is no less than 200 in the Regions with Convolutional Neutral Network.

12. The computer product according to claim 11, wherein in the Regions with Convolutional Neutral Network, an intersection over union of region proposals is more than or equal to 0.5.

13. The computer product according to claim 12, wherein the intersection over union of region proposals is more than or equal to 0.6 and less than or equal to 0.7.

14. The computer product according to claim 9, wherein the one or more processors further configured to execute the computer instructions to perform:
    selecting any two of the object regions with their distance within in a preset range as the two correlated ones of the object regions.

15. The computer product according to claim 9, wherein the one or more processors further configured to execute the computer instructions to perform:
    inputting the categories of the objects and the relative positional relationship between the objects to a probability knowledge network, and obtaining the semantic interpretation of the relative positional relationship between the objects.

* * * * *